(12) United States Patent
Hoerger

(10) Patent No.: US 10,170,152 B1
(45) Date of Patent: Jan. 1, 2019

(54) TAPE CARTRIDGE PARTIAL INITIALIZATION

(71) Applicant: HEWLETT PACKARD ENTERPRISE DEVELOPMENT LP, Houston, TX (US)

(72) Inventor: Carl R. Hoerger, Boise, ID (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/934,300

(22) Filed: Mar. 23, 2018

(51) Int. Cl.
*G11B 15/04* (2006.01)
*G11B 23/04* (2006.01)
*G11B 23/28* (2006.01)
*G11B 23/30* (2006.01)
*G11B 5/008* (2006.01)

(52) U.S. Cl.
CPC ........ *G11B 23/042* (2013.01); *G11B 5/00813* (2013.01); *G11B 15/04* (2013.01); *G11B 23/288* (2013.01); *G11B 23/30* (2013.01)

(58) Field of Classification Search
CPC ... G11B 2220/60; G11B 5/00813; G11B 5/09; G11B 15/05; G11B 15/04; G11B 15/07; G11B 15/087; G11B 15/689; G11B 15/8995; G11B 2220/90; G11B 27/032; G11B 27/107; G11B 5/584; G11B 19/04; G06F 3/0682; G06F 12/14; G06F 11/1012
USPC ...... 711/111, 163, 164, 166; 360/60, 53, 31, 360/69, 48, 77.12
See application file for complete search history.

(56) References Cited

U.S. PATENT DOCUMENTS

| 6,947,237 | B2 | 9/2005 | Christie, Jr. |
| 7,193,803 | B2 | 3/2007 | Jaquette |
| 7,224,545 | B2 * | 5/2007 | Saliba ............... G03C 1/015 360/48 |
| 7,441,075 | B2 | 10/2008 | Evans et al. |
| 7,469,314 | B2 | 12/2008 | Dahman et al. |
| 8,180,987 | B2 | 5/2012 | Hellman et al. |
| 2010/0161895 | A1 | 6/2010 | Qualls et al. |

OTHER PUBLICATIONS

Maxell, "Maxell LTO-Ultrium White Paper," Corporate Technology White Paper, pp. 1-4 (online), Retrieved from the Internet on Mar. 8, 2017 at URL: <coolspirit.co.uk/files/document/82/1439813440_LTO_Ultrium_White_Paper.pdf>.

* cited by examiner

*Primary Examiner* — Nabil Hindi
(74) *Attorney, Agent, or Firm* — Hewlett Packard Enterprise Patent Department

(57) ABSTRACT

An example tape storage drive may include reading/writing circuitry and control circuitry. The reading/writing circuitry may be to read from and write to tape media of tape cartridges. The processing circuitry may be to, in response to a tape cartridge being loaded into the tape storage drive, validate initialization of the tape cartridge. The processing circuitry may be to, in validating initialization of the tape cartridge, determine whether a tape format portion of a cartridge memory of the tape cartridge contains tape format data and whether the tape format portion is write-locked. If the tape format portion contains tape format data and is not write-locked, then the processing circuitry may fully initialize the tape cartridge including selecting a tape format for the tape cartridge and updating the tape format data to specify the selected tape format, write-lock the tape format portion, and then deem initialization of the tape cartridge to be complete.

20 Claims, 6 Drawing Sheets

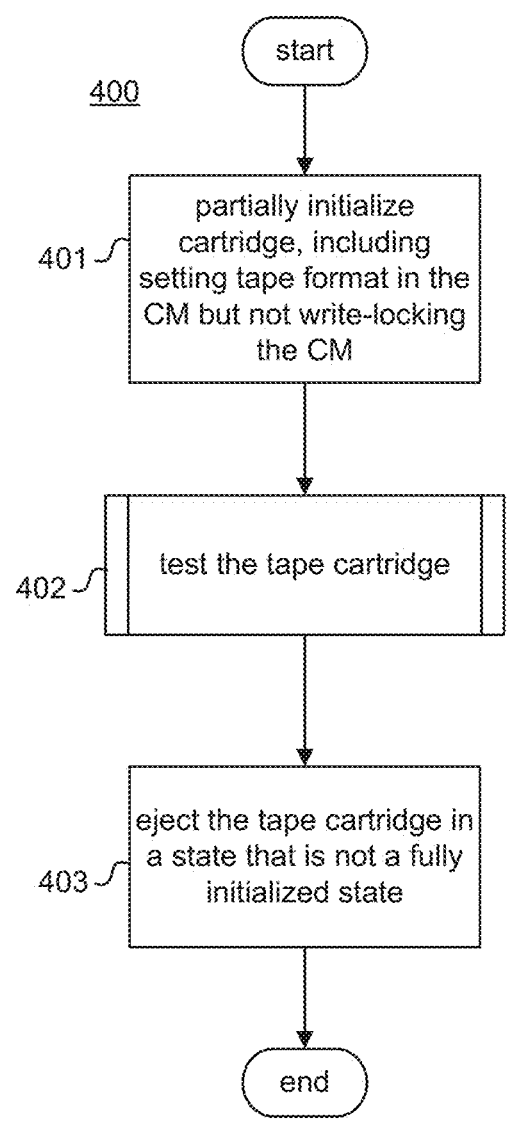

TAPE CARTRIDGE PARTIAL INITIALIZATION

BACKGROUND

Some storage systems may store digital information in tape-based storage media (hereinafter, "tape"), such as magnetic tape. A tape storage drive is an electronic device that can read data from and write data to tape. A tape cartridge may house a reel of tape, and the tape cartridge may be loaded into a tape storage drive to make the tape available for reading/writing. A tape cartridge may also include a cartridge memory, which is a data storage device that may store information about the tape cartridge, such as manufacturer identifiers, a specification of the format of the tape cartridge, and other configuration and/or initialization information.

The formats of tape cartridges and the tape drives that utilize them may be specified in an format specification (such as one of the Linear Tape-Open ("LTO") generations) or a proprietary specification (such as in IBM's 3592 series). Such open formats and proprietary specifications (both will be referred to hereinafter as simply "specifications") may specify, among other things, the form factors of the tape cartridge and the tape, a configuration of the tape drives, and a format for data storage on the tape (hereinafter "tape format"). In particular, the tape format may include, for example, a total storage capacity for a cartridge, how stored bits are to be organized on the tape (e.g., bands, wraps, tracks, etc.), whether/how bits are to be encrypted and/or compressed, and so on. For example, LTO6 compliant tape cartridges may use one tape format that has 2.5 TB capacity, while LTO7 compliant tape cartridges may use another tape format that has 6 TB capacity (note that the number following "LTO" designates a generation).

In some examples, a single tape cartridge may be compatible with (i.e., capable of using) multiple tape formats. Such cartridges may be referred to herein as multiple-format cartridges. For example, if two different tape specifications have the same cartridge and tape form factors as one another, but have different tape formats, then in some instances a single tape cartridge might be capable of being formatted according to either of the two specifications. For example, a given tape cartridge may be capable of being formatted according to LTO7, but it also may also be capable of being formatted according to LTO7-Type M (although not both at the same time). As another example, an IBM JC tape cartridge may be capable of being formatted according to either of IBM's TS1150 or TS1140 formats.

BRIEF DESCRIPTION OF THE DRAWINGS

FIG. 5 is a process flow diagram illustrating an example process for end-point testing a tape cartridge.

DETAILED DESCRIPTION

Figure 1A:
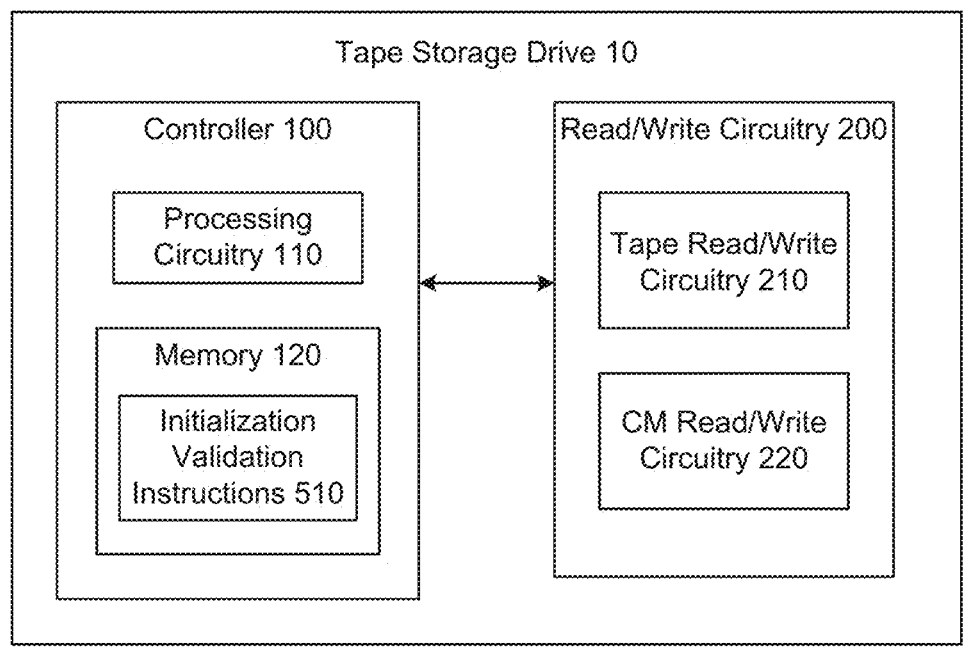
FIG. 1A illustrates an example tape storage drive.

In general, a tape drive needs to be able to distinguish which format a cartridge contains prior to reading or appending data. Thus, a tape cartridge may generally include some sort of indication of its tape format. In addition, it may be desirable, in some circumstances, to prevent undesired reformatting of the tape cartridges after their tape format has been set. Thus, in some tape cartridges the indication of the tape format may be made unchangeable in some fashion at some point in the lifecycle of the cartridge, to prevent the cartridge from being reformatted.

For example, in a first approach, tape format information is written in a cartridge memory (CM) of a tape cartridge, which allows the tape drive to determine the tape format of the cartridge prior to allowing user I/O to the tape by reading the format information from the CM. In addition, the CM may also be used to prevent undesired reformatting of the tape cartridges. Specifically, in the first approach, tape drives may be configured to write-lock the tape format information that is written in the CM at the same time that the cartridge is first initialized (i.e., as soon as the format information has been written for the first time, it is write-locked). For example, the CM may include a protectable region that becomes write-locked (i.e., read-only) as soon as a specific value (e.g., 1) is written to a specific location, and the tape drives may be configured to, during the first initialization of the tape cartridge, write the format information in the protectable region along with the specific value that locks the region. In this approach, the first initialization occurs when the tape cartridge is first used in a tape drive, and therefore the format of the cartridge is fixedly set the first time that the tape cartridge is used.

As another example, in a second approach, tape format information may be indicated by a physical indicator on a cartridge body and/or on the tape. Tape drives may then determine the appropriate tape format for the tape cartridges based on the indicator. The physical indicator may be difficult or impossible to change (or, in some cases, difficult to change without the change being detectable by a tape drive), and there the physical indicators may prevent reformatting.

There may be various reasons why a producer of a tape cartridge may want to prevent the tape format from being changed once set. For example, a producer may want to prevent someone from reformatting the cartridge to use an incompatible, untested, or inferior tape format, as such reformatting could impair the functioning of the tape cartridge, causing customer dissatisfaction. As another example, a producer may want to prevent older generation cartridges from being upgraded to use a newer generation tape format even if the newer generation tape format is compatible with the cartridges, in order to encourage cartridge sales of the newer generation.

While the first and second approaches noted above may be effective at preventing reformatting of tape cartridges, they may also give rise to some side effects that may be undesirable in some circumstances. In particular, one challenge that arises when seeking to prevent undesired reformatting is how to do so while also enabling someone other than the manufacturer to set the format of the cartridges, particularly for cartridges that are subjected to end-point testing. Both the first and second approaches may fail to enable someone other than the manufacturer to set the format of the cartridges for at least end-point tested cartridges. (End-point testing refers to manufacturers testing a sampling of tape cartridges before shipping/selling them to check their quality, and includes loading a tape cartridge into a tape drive, initializing the cartridge, writing test data to the tape, and reading the test data back from the tape.)

There may be a variety of reasons why it may be desirable, in some circumstances, to allow someone other than the cartridge manufacturer to set the final format of the tape cartridge. For example, a cartridge manufacturer may desire end-users to be able to choose the tape format (perhaps from among a limited set of acceptable formats) for newly purchased tape cartridges when the end-user first uses the tape cartridge. This may be desirable to the manufacturer because, for example, it may encourage sales of newer generation cartridges since it may allow newer generation tape cartridges to be purchased by both end-users who have older generation tape drives and end-users who have newer-generation tape drives, as the tape cartridges may be formatted by the user according to their specific needs. As another example, a cartridge manufacturer may desire a distributor/seller to be able to choose and set the format of the cartridges it sells. This may allow, for example, the manufacturer to provide a stock of identical cartridges to the distributor/seller, who can then generate different generations of tape cartridges from this stock based on customer demand. (Note that allowing someone else to set the format does not necessarily mean giving them total freedom to choose any format—it may be desirable, for example, to allow tape formats from the same or earlier generations as the cartridge to be chosen, while preventing formats from later generations from being chosen.)

One reason that the first approach fails to enable someone other than the manufacturer to set the format of end-point tested cartridges is that end-point testing under the first approach fixes the format of the tested cartridges. In particular, during the end-point testing of a tape cartridge, the cartridge is used in a tape drive and thus is initialized. Recall that under the first approach, upon the first initialization of the cartridge, the format information written in the CM is write-locked. Thus the format of any tape cartridge that is end-point tested using the first approach is set by the manufacturer during the testing and would be unchangeable after the testing.

One reason that the second approach fails to enable someone other than the manufacturer to set the format of end-point tested cartridges is that, in some examples, the physical indicators are made for each cartridge by the manufacturer as part of the manufacturing process, and, once made, the indicators may be unchangeable. Furthermore, even in examples in which the manufacturer does not make the indicators for every cartridge, the manufacturer would still need to make the indicators for at least the end-point tested cartridges, since the cartridges would need to be formatted in order to conduct the testing. Thus, similar to the first approach, the format of at least the tested cartridges would be set by the manufacturer and would be unchangeable after the testing.

Accordingly, the present disclosure provides various technologies that may resolve the difficulties noted above. In particular, examples described herein may be able to prevent undesired reformatting of all tape cartridges while also enabling someone other than the manufacturer to set the final format of all of the cartridges, including end-point tested cartridges. This is accomplished, at least in part, by providing specially configured test drives to do the end-point testing of cartridges, where the test drives are configured to place the tested cartridges into a partially initialized state for the testing rather than fully initializing the cartridges (the partially initialized state is a new type of initialization state, described in greater detail below). In conjunction with this, regular test drives are configured to detect and deal with such partially initialized cartridges. These and other aspects of examples described herein overcome the various difficulties noted above, as described in greater detail below.

Specifically, in examples described herein, tape format information is written in a protectable region of the CM of a tape cartridge, similar to the first approach. In these examples, the first time that any tape cartridge is used in a non-test tape storage drive, the cartridge is fully initialized and the protectable region of the CM is write-locked. Thus, once the tape format of a cartridge has been set for the first time by a non-test tape storage drive, subsequent reformatting of the cartridge is prevented.

However, unlike the first approach, when a tape cartridge is end-point tested, the tape cartridge is not fully initialized as a result of the test—specifically, in examples described herein, the protectable region of the CM is not write-locked as a result of the test. Instead, the tape cartridge that is end-point tested is partially initialized during the test, which includes writing format information to the protectable region of the CM but refraining from write-locking the protectable region. Because the protectable region of the CM in a cartridge that was end-point tested (i.e., a partially initialized cartridge) is not yet write-locked, it is possible for the tape format of the cartridge to be changed even after the testing. In addition, in examples disclosed herein, regular (non-test) tape drives may be configured to fully initialize any uninitialized or partially initialized cartridge that are used in the drive, which may include updating the tape format for a partially initialized cartridge, as well as write-locking the protectable region of the CM. This means that the first time that any end-point tested (i.e., partially initialized) tape cartridge is used in any regular tape drive after its testing, it will be converted to a fully initialized state. Thus, whoever is operating the first regular tape drive that the tested cartridge is used in after it is end-point tested may be able to set the final tape format of the cartridge, which cannot be changed thereafter. The person operating the first non-test tape drive that the cartridge is used in may be someone other than the manufacturer, and therefore in examples described herein someone other than the manufacturer is able to set the final format for even tape cartridges that have been end-point tested.

Although examples described herein may allow cartridges that were previously end-point tested to have their format changed after the testing, this does not mean that the tested cartridges fail to satisfy the goal of preventing uncontrolled reformatting. In particular, in examples described herein, for both tape cartridges that were end-point tested and tape cartridges that were not end-point tested, the first regular tape drive in which the cartridge is used fixes the final tape format for the cartridge. Thus, both the tested and untested cartridges are prevented from being reformatted after their final format has been set.

Thus, in examples described herein, undesired reformatting is prevented while still allowing for someone other than the manufacturer to set the final format of the cartridges, even for end-point tested cartridges.

Note that, in examples disclosed herein, a distinction is drawn between tape drives that are configured to partially initialize cartridges for end-point testing (herein "test drives") and tape drives that are not so configured (herein "regular tape drives", "non-test tape drives", or just "tape drives"). In some examples, test drives may be restricted to a limited set of authorized users, such as tape manufactures, while the tape drives that are available to the general public may all be non-test tape drives.

1—Example Tape Drives

As noted above, in some examples, regular tape drives are configured such that any time that an uninitialized or partially initialized tape cartridge is used in a regular tape drive, the drive fully initializes the cartridge. Thus, each regular test drive may be configured to detect any uninitialized or partially initialized tape cartridge inserted therein, and, prior to allowing the tape cartridge to be used, automatically fully initialize the cartridge, including write-locking the protected region of the CM. In addition, the tape drive may be configured to update the tape format to a desired format while fully initializing the tape cartridge. Note that updating the tape format may include changing the tape format if it is not already the desired tape format, or leaving the format unchanged if it already matches the desired format. The tape drive may change the tape format, if desired, by overwriting the tape format information in the CM before write-protecting the protected region.

Figure 3:
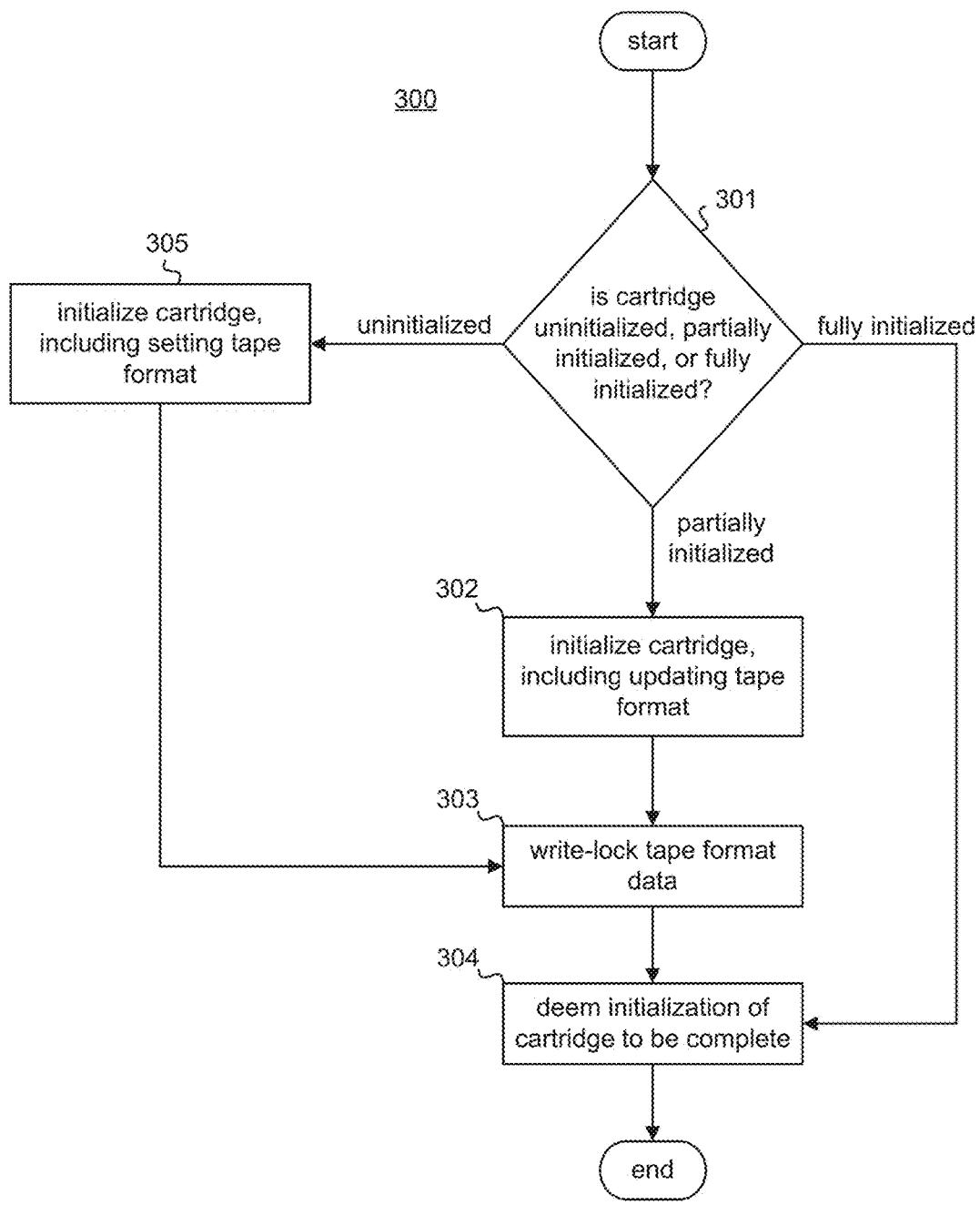
FIG. 3 is a process flow diagram illustrating an example process for validating initialization of a tape cartridge.
Figure 4:
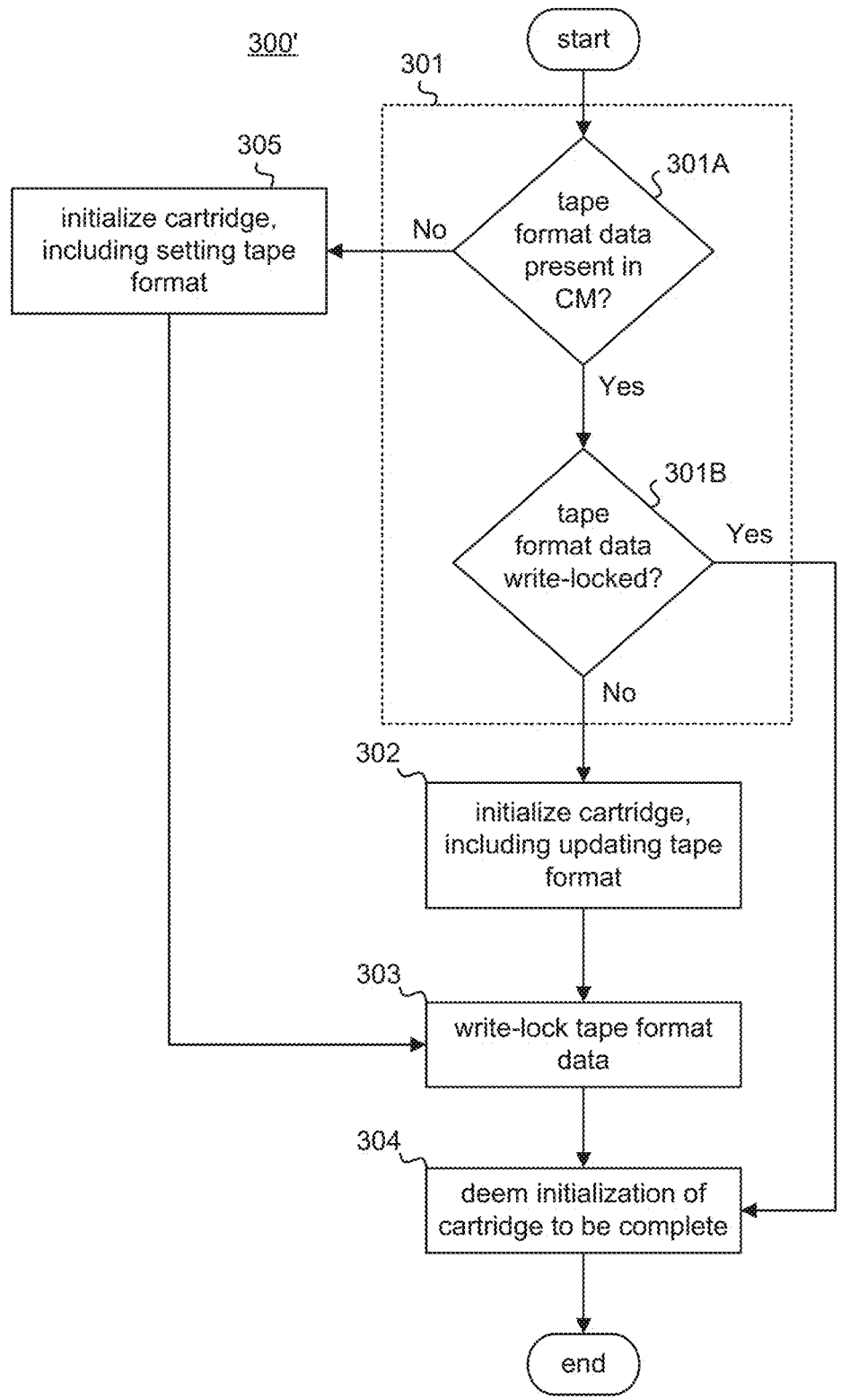
FIG. 4 is a process flow diagram illustrating an example of a specific implementation of the process of FIG. 3.

The tape drives may detect that a tape cartridge is partially initialized as part of a process of validating initialization of the cartridge, such as the example processes 300 and 300' illustrated in FIGS. 3 and 4. In particular, the tape drive may be configured to validate initialization of every tape cartridge that is attempted to be used in the drive. This validation may include determining whether the tape cartridge is uninitialized (i.e., no format information is included in the protectable region of the CM), partially initialized, or fully initialized (i.e., format information is included in the protectable region of the CM and the protectable region is write-locked).

FIG. 1A illustrates an example tape drive 10. The tape drive 10 includes a controller 100 that is to control operations of the tape drive 10. The tape drive 10 also includes read/write circuitry 200 that is to read from and write to the tape 22 and the CM 23 of a tape cartridge 20 that has been loaded into the tape drive 10 (see also FIG. 2). The tape drive 10 may also include various mechanical components (see elements 212-214 in FIG. 2) to facilitate reading of the tape 22.

The controller 100 includes processing circuitry 110, which may include a number of processors that are capable of executing machine-readable instructions, dedicated hardware, or any combination of these. In particular, in some examples, any function described herein as being performed by a controller of a tape drive (including the controller 100) may be performed by at least one processor executing instructions stored on at least one machine-readable medium. As used herein, "processor" refers to any circuitry capable of executing machine-readable instructions, such as a central processing unit (CPU), a microprocessor, a microcontroller device, a digital signal processor (DSP), etc. As used herein, "dedicated hardware" may include application-specific integrated circuits (ASICs), complex programmable logic devices (CPLDs), field-programmable gate arrays (FPGAs), application-specific instruction set processors (ASIP), discrete logic circuits, network interface cards (NIC), adaptors (e.g., host adaptor), etc. As noted above, the controller 100 controls the operations of the tape drive 10, including controlling the read/write circuitry 200.

In some examples, the controller 100 may also include a memory 120 that is communicably coupled to processors of the processing circuitry 110 and stores initialization validation instructions 510. The initialization validation instructions 510 may be such that, if they were executed by a processor of the processing circuitry 110, they would cause the processing circuitry 110 to perform, or control the performance of, any of the operations that are described herein as being performed by a (non-test) tape drive, such as any of the operations described in relation to FIGS. 3 and 4. The memory 120 may include any non-transitory machine-readable medium that is capable of storing digital data, including volatile media such as random-access-memory (RAM) (e.g., DRAM, SRAM, etc.) and/or persistent (non-volatile) media such as non-volatile memory (e.g., PROM, EPROM, EEPROM, NVRAM, etc.), flash drives, hard disk drives, optical disks, etc.

Figure 2:
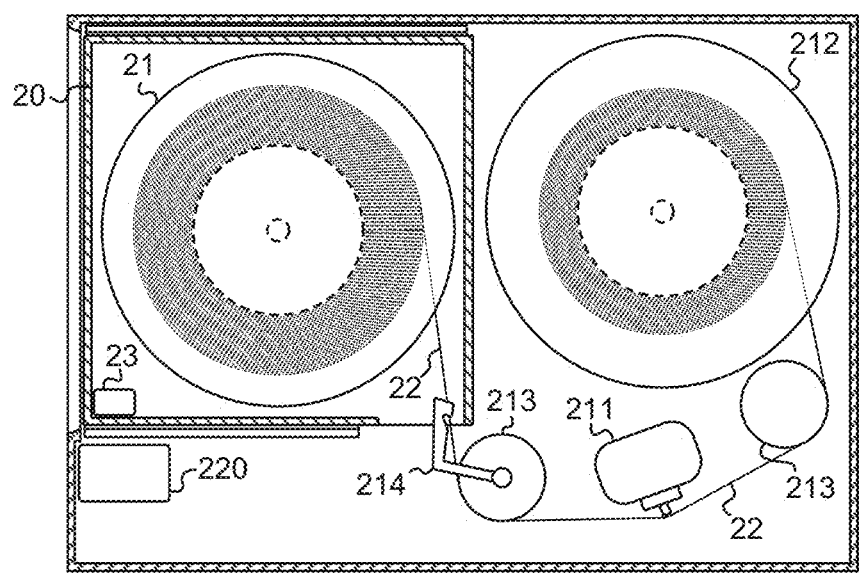
FIG. 2 illustrates example components of the tape drive.

The read/write circuitry 200 includes tape read/write circuitry 210 and CM read/write circuitry 220. The tape read/write circuitry 210 is to read data from and write data to the tape 22 of a tape cartridge 20 that has been loaded into the tape drive 10. As illustrated in FIG. 2, the tape read/write circuitry 210 may include, for example, a head 211 that reads data from or writes data to the tape 22. As noted above, the tape drive 10 may also include various mechanical components that facilitate reading of the tape 22, such as, for example: a take-up spool 212 that the tape 22 is wound around as it is pulled from the tape cartridge 20, guides 213 that direct the tape 22 over the head 211 and onto the take-up spool 212, and a latching mechanism 214 that is to grab an end of the tape 22 and connect it with a guide line (not illustrated) that pulls the tape 22 onto the take-up spool 212.

The CM read/write circuitry 220 is to read data from and write data to the CM 23 of a tape cartridge 20 that has been loaded into the tape drive 10. The CM 23 may be any non-volatile solid state storage medium, such as PROM, EPROM, EEPROM, NVRAM, etc. The CM 23 may include an interface for communication, and the CM read/write circuitry 220 may include a complementary interface that is to communicably connect with the interface of the CM 23 when the tape cartridge 20 has been loaded into the tape drive 10. In some examples, the interface of the CM 23 may require direct electrical contact, but in other examples the CM 23 may be read/written using a contactless interface that utilizes electromagnetic radiation to transfer data. For example, in some examples the CM 23 may include a passive 13.56 MHz radio frequency (RF) interface, in which case the CM read/write circuitry 220 may include a contactless coil to communicate with the RF interface.

2—Example Test Drives

A test drive may be any tape drive that is configured to partially initialize a tape cartridge as part of end-point testing the tape cartridges, where the partial initialization includes writing the format information in the protectable region of the CM without write-locking the protectable region. In addition, the test drive may be configured to, once the testing is completed, eject the cartridge from the test drive with the cartridge still being in a partially initialized state (i.e., with the format information being in the protectable region, and the protectable region being unlocked).

In some examples, the test drives may be configured differently than regular tape drives. For example, when an uninitialized tape cartridge is inserted into a test drive, the test drive partially initializes the tape cartridge. In contrast, the regular test drive might not be capable of partially initializing any cartridges, and instead when an uninitialized tape cartridge is inserted into a regular tape drive, the tape drive fully initializes the cartridge. As another example, the regular tape drives may be configured to detect partially initialized cartridges and fully initialize them. In contrast, the test drives might not fully initialize any cartridges. In some examples, these differences in configuration may result, for example, from installing different software instructions in the test drives and regular tape drives. In some examples, a test drive may be structurally identical to a regular tape drive, with the exception that a controller of a test drive may be differently configured than a controller of a regular tape drive (for example, by virtue of having different instructions (e.g., firmware)).

Figure 1B:
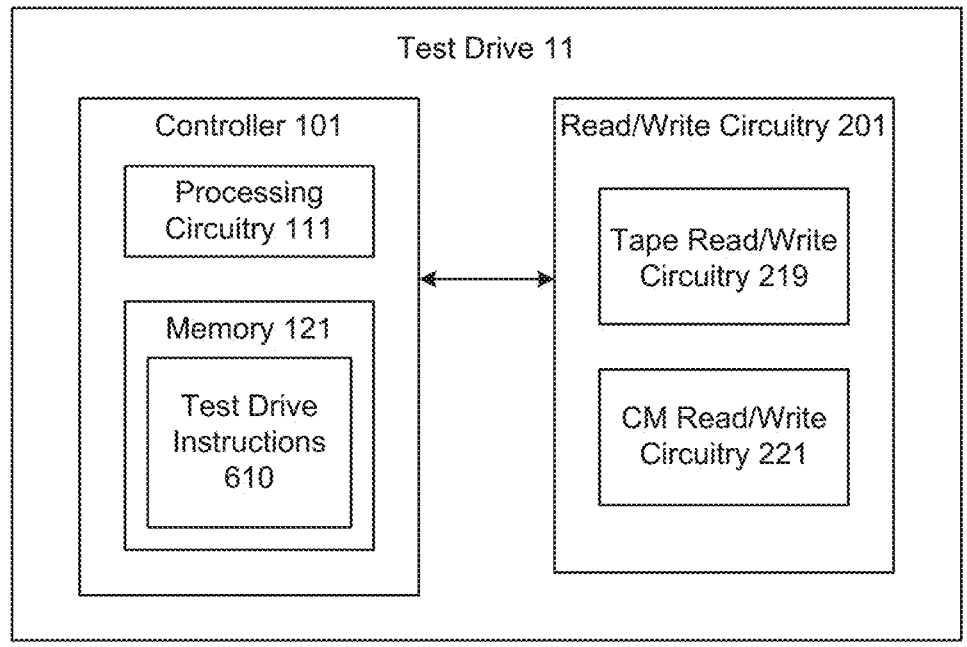
FIG. 1B illustrates an example test drive.

FIG. 1B illustrates an example test drive 11. The test drive 11 includes a controller 101 that it to control operations of the test drive 11. The test drive 11 also includes read/write circuitry 201 that is to read from and write to the tape 22 and the CM 23 of a tape cartridge 20 that has been loaded into the tape drive 11, similar to the tape drive 10. The test drive 11 may also include mechanical components to facilitate reading of the tape 22, similar to the tape drive 10.

The controller 101 includes processing circuitry 111, which may include a number of processors that are capable of executing machine-readable instructions, dedicated hardware, or any combination of these. In particular, in some examples, any function described herein as being performed by a controller of a test drive (including the controller 101) may be performed by at least one processor executing instructions stored on at least one machine-readable medium.

In some examples, the controller 101 may also include a memory 121 that is communicably coupled to processor(s) of the processing circuitry 110 and stores test drive instructions 610. The test drive instructions 610 may be such that, if they were executed by a processor of the processing circuitry 111, they would cause the processing circuitry 111 to perform, or control the performance of, any of the operations that are described herein as being performed by a test drive, such as any of the operations of FIG. 4. The memory 121 may include any non-transitory machine-readable medium that is capable of storing digital data, including volatile media such as random-access-memory (RAM) (e.g., DRAM, SRAM, etc.) and/or persistent (non-volatile) media such as non-volatile memory (e.g., PROM, EPROM, EEPROM, NVRAM, etc.), flash drives, hard disk drives, optical disks, etc.

The read/write circuitry 200 includes tape read/write circuitry 219 and CM read/write circuitry 221. The tape read/write circuitry 219 is to read data from and write data to the tape 22 of a tape cartridge 20 that has been loaded into the test drive 11. The CM read/write circuitry 221 is to read data from and write data to the CM 23 of a tape cartridge 20 that has been loaded into the test drive 11. In some examples, the tape read/write circuitry 219 is constituted similarly to the tape read/write circuitry 210 described above, and therefore duplicative description of the read/write circuitry 219 is omitted. In some examples, the CM read/write circuitry 221 is constituted similarly to the tape CM read/write circuitry 220 described above, and therefore duplicative description of the CM read/write circuitry 221 is omitted. In some examples, the mechanical components of the test drive 11 that facilitate reading of the tape 22 are similar to the corresponding components of the tape drive described above, and fore duplicative description thereof is omitted.

In some examples, the test drive 11 may be physically identical to a regular tape storage drive (such as the tape drive 10), with the exception that the test drive 11 has the test drive instructions 610 while the regular tape drive does not. In other words, in some examples, the test drive 11 may be formed by configuring a non-test tape storage drive as a test drive, which may be done by installing the test drive instructions 610 in the drive.

3—Example Processes for Validating Initialization of a Tape Cartridge

FIG. 3 illustrates an example process/method 300 of validating initialization of a tape cartridge. FIG. 4 illustrates an example process 300' that is a specific implementation example of the process 300. The example processes 300/300' may be performed, for example, by a tape drive, such as the tape drive 10 described above. In particular, the operations of the processes 300/300' may be performed by a controller of a tape drive, such as the controller 100. In this context, it should be understood that the controller may "perform" an operation directly or indirectly, where indirect performance of an operation means causing and/or controlling another entity (such as read/write circuitry) to perform the operation.

For example, the example processes 300/300' may be embodied (in whole or in part) in machine readable instructions that, when executed by a processor of a controller, cause the controller to perform (some or all of) the operations of the example processes (such as, for example, the initialization validation instructions 510). As another example, the example processes 300/300' may be embodied (in whole or in part) in logic circuits of dedicated hardware of the controller that perform (some or all of) the operations of the example process.

The controller may perform one of the processes 300/300' in response to a tape cartridge being loaded into the tape storage drive. In particular, in some examples the controller may perform one of the processes 300/300' prior to allowing any I/O access to the tape.

Turning now to the example process 300 of FIG. 3, in block 301, the controller determines whether the tape cartridge is uninitialized, partially initialized, or fully initialized. If the cartridge is uninitialized (i.e., there is no tape format data in the CM), then the process continues to block 305. If the cartridge is partially initialized (i.e., there is tape format data, but it is not write-locked), then the process continues to block 302. If the cartridge is fully initialized (i.e., there is tape format data and it is write-locked), then the process continues to block 304. The initialization state of the cartridge may be determined based on any criteria that may be indicative of initialization state. For example, there may be flags in the CM that indicate an initialization state of the cartridge, and in block 301 the controller may read these flags to determine the initialization state of the cartridge. As another example, the controller may determine the initialization state of the cartridge by examining whether tape format data is present and write locked (see FIG. 4).

In block 302, the controller fully initializes the tape cartridge. This includes selecting a tape format for the tape cartridge and updating the tape format data in the tape format portion of the CM to specify the selected tape format. As used herein, "updating" the tape format data to specify the selected tape format does not necessarily mean changing the tape format data. In particular, in some examples, updating the tape format data to specify the selected tape format may include (1) checking whether the tape format data in the CM already specifies the selected tape format, and (2) overwriting or leaving unchanged the tape format data based on whether the tape format data already specifies the selected tape format. In other words, in updating the tape format data, if the format data already specifies the selected tape format, then the tape format data may be left unchanged in the CM. On the other hand, in updating the tape format data, if the format data in the CM does not specify the selected tape format, then the updating of the tape format data includes overwriting the tape format data with new tape format data.

In some examples, the selection of the tape format may be made based on user input. In some examples, the selection of the tape format may be automatic without user input—for example, a latest generation that the tape drive supports may be automatically selected. In some examples, the tape format is selected from a set of formats that the tape storage drive and the tape cartridge are authorized to use. In some examples, a format is authorized to be used if the format is compatible with the cartridge and the drive, and neither the cartridge nor the drive it forbidden to use the format by the specification implemented by the tape drive and/or cartridge. For example, the LTO specifications generally forbid a tape drive of one generation to format a tape cartridge to a later-generation tape format, but may allow the tape drive to format a tape cartridge to certain (but not necessarily all) earlier generation formats. In some examples, a storage unit of the tape drive and/or the CM of the cartridge may include a list (or lists) of authorized formats, and the tape drive may select the tape format from such a list.

The initialization of block 302 may also include additional operations besides setting the format of the cartridge. For example, the tape specification used by the tape drive and/or cartridge may specify various initialization operations, and these may also be performed as part of block 302.

In block 303, the controller write-locks the tape format portion of the CM. For example, the controller may set a protection flag/bit in the CM that controls write locking of the tape format portion. In some examples, the tape format portion and other portions of the CM are all write-locked together—for example, in some LTO specifications, setting the Protection Flag write-locks all protectable portions of the CM (i.e., all of the portions specified in the LTO CM Write Inhibit page). As used herein, write-locking a storage location means preventing the location from being written to thereafter, i.e., making the location read-only.

In block 304, the controller deems the initialization of the cartridge to be complete. Deeming the initialization of the cartridge to be complete includes causing the controller to treat the cartridge as a fully initialized cartridge. Note that deeming the initialization to be complete does not necessarily require any sort of explicit or implicit communication, such as displaying or sending a message—rather, the "deeming" is merely a matter of how the controller treats the cartridge. For example, if the drive prevents certain operations for cartridges that are not yet fully initialized, then deeming the cartridge as fully initialized may include simply allowing those operations to now be performed. For example, according to some tape specifications, a tape drive may allow user I/O to the tape only once the cartridge has been fully initialized, in which case deeming the initialization of the cartridge to be complete may result in allowing user I/O to the tape. (In some examples, some non-user I/O may be allowed to the tape before initialization is complete—for example, in some instances initialization data may be written to the tape as part of initializing the cartridge). After block 304, the process may end.

In block 305, the controller fully initializes the tape cartridge. Because the tape cartridge is completely uninitialized in block 305, the initialization of block 305 includes setting the tape format for the cartridge in the tape format portion of the CM for the first time. The initialization of block 305 may also include additional operations besides setting the format of the cartridge. For example, the tape specification used by the tape drive and/or cartridge may specify various initialization operations, and these may also be performed as part of block 305.

The process 300' of FIG. 4 will now be explained. The process 300' of FIG. 4 is one specific implementation example of the process 300 of FIG. 3. More specifically, the process 300' includes all of the operations of the process 300, and in addition specifies that the determination of block 301 is implemented via blocks 301A and 301B (which is just one example of how the determination of block 301 may be made). Operations of the process 300' that are the same as operations of the process 300 are given the same reference numerals in FIGS. 3 and 4, and duplicative description of these features is omitted below.

In block 301A, the controller determines whether the tape format portion of a CM of the tape cartridge contains tape format data. If the answer is yes, then the process continues to block 301B. If the answer is no, then the cartridge is uninitialized and the process continues to block 305.

The tape format portion of the CM may be any specific storage location (e.g., block), data field, or group of storage locations or data fields (e.g., multiple blocks, a page, multiple pages, etc.) of the CM that is write-lockable and in which a tape format is expected to be specified. For example, under some LTO specifications, the tape format portion would be stored in an Initialization Data page of the CM. The tape format data may be include data that fully or partially specifies the tape format of the tape cartridge. For example, the tape format data could include a code that identifies a particular tape format, specification, or generation, an indication of a maximum capacity for the tape cartridge, an indication of whether the cartridge is read/write or write-once-read-many (WORM), etc.

In some examples, the determination of bock 301A may be made by reading the tape format portion of the CM and checking whether tape format data is included in what is read from the CM. In some examples, the determination of bock 301A may be made by reading a specific location of the CM (e.g., a flag bit) that indicates whether the tape format portion of the CM contains tape format data.

In block 301B, the controller determines whether the tape format portion of the CM is write-locked. If the tape format portion of the CM is write-locked, then the cartridge is fully initialized already, and therefore the process continues to block 304. If the tape format portion of the CM is not write-locked, then the cartridge is partially initialized, and therefore the process continues to block 302.

In some examples, the determination of block 301B may be made by checking a specific location of the CM that controls whether a protectable portion of the CM is write-locked. For example, in some LTO specifications, an LTO CM Write Inhibit page may include an identification of a range of addresses to be protected, and a Protection Flag that is set when the range is write-locked (the LTO CM Write Inhibit page itself is in the range of protected addresses, and thus write-locking cannot be removed once it is set).

Although not illustrated, there may be exceptions included in the processes 300/300' that may result in aborting the process in the event of an error or failure and beginning an error handling and/or recovery process.

4—Example Processes for End-Point Testing a Tape Cartridge

FIG. 5 illustrates an example process/method 400 of end-point testing a tape cartridge. The example process 400 may be performed, for example, by a test drive (i.e., a tape drive that has been configured as a test drive), such as the test drive 11 described above. In particular, the operations of the process 400 may be performed by a controller of a test drive, such as the controller 101. In this context, it should be understood that the controller may "perform" an operation directly or indirectly, where indirect performance of an operation means causing and/or controlling another entity (such as read/write circuitry) to perform the operation.

For example, the example process 400 may be embodied (in whole or in part) in machine readable instructions that, when executed by a processor of a controller, cause the controller to perform (some or all of) the operations of the example process (such as, for example, the test drive instructions 610). As another example, the example process 400 may be embodied (in whole or in part) in logic circuits of dedicated hardware of the controller that perform (some or all of) the operations of the example process.

The controller may perform the process 400 in response to a tape cartridge being loaded into the test drive. In block 401, the controller may partially initialize the tape cartridge. This includes setting a tape format for the tape cartridge in a tape format portion of the CM of the tape cartridge. However, the controller refrains from write locking the tape format portion of the CM. For example, if the CM is write-locked by writing a specific value to a specific location of the CM, the controller refrains from writing that value to that location when the controller writes the format data to the CM. The partial initialization of block 401 may also include additional operations besides setting the format of the cartridge. For example, the tape specification used by the tape drive and/or cartridge may specify various initialization operations, and these may also be performed as part of block 401 (except for write-locking the tape format portion of the CM).

In block 402, a sub-process of testing the tape cartridge is initiated. The testing may correspond to any known or yet to be known process of testing a tape cartridge. For example, the testing may include writing test data to the tape of the tape cartridge, reading the test data back from the tape, and determining whether and/or how many errors occurred in the reading and/or writing. In some examples, the testing may be automated—that is, the test drive may perform operations of the testing (such as writing test data, reading the data back, etc.) without being instructed/controlled by another entity. In other examples, the testing may be performed manually using the test drive—that is, another entity, such as a human user or a testing program running on a separate device, may instruct/control the test drive to perform the operations of the testing. Once the testing is completed, the process continues to block 403.

In block 403, the controller causes the tape cartridge to be ejected from the test drive while the cartridge is in a state that is not a fully initialized state. In other words, the controller ejects the cartridge in a state in which the format portion of the CM is not write-locked. Thus, the testing (including the initialization that occurs as part of the testing) does not result in write-locking the tape format portion of the CM. In some examples, the controller ejects the tape cartridge in the partially initialized state—i.e., the format data remains in the tape format portion of the CM, but is not write-locked. In other examples, the controller may erase the tape format data prior to ejecting the tape cartridge, and thus the tape cartridge may be in an uninitialized state when ejected.

Although not illustrated, there may be exceptions included in the process 400 that may result in aborting the process in the event of an error or failure and beginning an error handling and/or recovery process.

5—Example Processor Executable Instructions

Figure 6A:
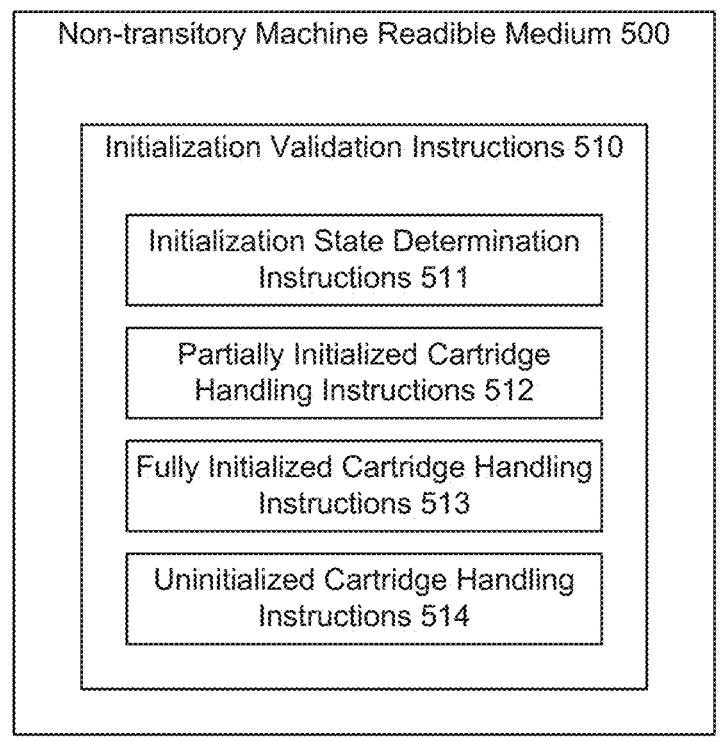
FIG. 6A illustrates an example non-transitory machine readable medium storing example initialization validation instructions.
Figure 6B:
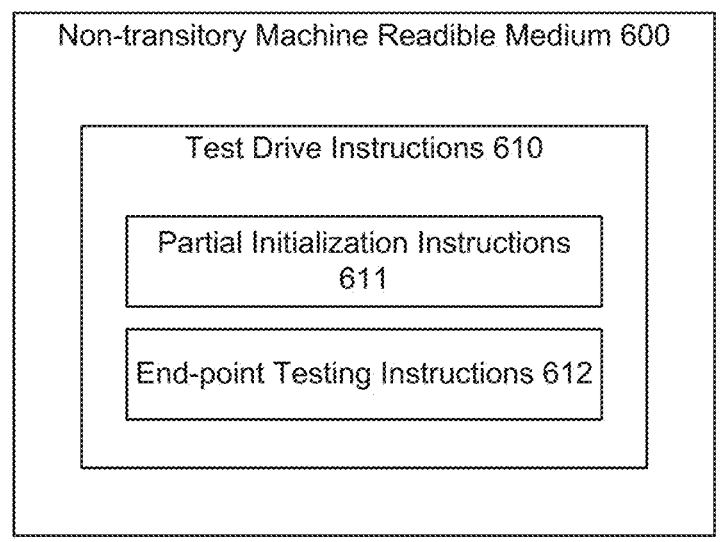
FIG. 6B illustrates an example non-transitory machine readable medium storing example test drive instructions.

FIGS. 6A and 6B illustrate example processor executable instructions stored on non-transitory machine readable media 500 and 600. In particular, FIG. 6A illustrates initialization validation instructions 510 that are stored on the medium 500, and FIG. 6B illustrates test drive instructions 610 that are stored on the medium 600.

5.1—Example Initialization Validation Instructions

The initialization validation instructions 510 may include instructions to perform any or all of the operations described above in relation to a non-test tape storage drive, including, for example, any or all of the operations of the example processes 300/300' illustrated in FIGS. 3 and 4. For example, the initialization validation instructions 510 may include initialization state determination instructions 511, partially initialized cartridge handling instructions 512, fully initialized cartridge handling instructions 513, and uninitialized cartridge handling instructions 514.

The initialization state determination instructions 511 may include instructions to determine an initialization state of the cartridge, which may be executed in response to a tape cartridge being loaded into the tape storage drive. For example, the initialization state determination instructions 511 may include instructions to perform the operations of block 301 of processes 300/300'.

The partially initialized cartridge handling instructions 512 may include instructions for how to handle cartridges that are partially initialized, which are to be executed in response to the initialization state of the cartridge being determined to be partially initialized. In particular, the partially initialized cartridge handling instructions 512 may include instructions to fully initialize the tape cartridge before treating the cartridge as ready for normal use. For example, the partially initialized cartridge handling instructions 512 may include instructions to perform the operations of blocks 302-304 of the processes 300/300'.

The fully initialized cartridge handling instructions 513 may include instructions for how to handle cartridges that are fully initialized, which are to be executed in response to the initialization state of the cartridge being determined to be fully initialized. In particular, the fully initialized cartridge handling instructions 513 may include instructions to treat the cartridge as ready for normal use. For example, the fully initialized cartridge handling instructions 513 may include instructions to perform the operations of block 304 of the processes 300/300'.

The uninitialized cartridge handling instructions 514 may include instructions for how to handle cartridges that are uninitialized, which are to be executed in response to the initialization state of the cartridge being determined to be uninitialized. In particular, the uninitialized cartridge handling instructions 514 may include instructions to fully initialize the tape cartridge before treating the cartridge as ready for normal use. For example, the partially initialized cartridge handling instructions 512 may include instructions to perform the operations of blocks 305 then 303-304 of the processes 300/300'.

5.2—Example Test Drive Instructions

The test drive instructions 610 may include instructions to perform any or all of the operations described above in relation to a test drives, including, for example, any or all of the operations of the example process 400 illustrated in FIG. 5. For example, the test drive instructions 610 may include partial initialization instructions 611. In some examples in which end-point testing is automated, the test drive instructions 610 may also include end-point testing instructions 612.

The partial initialization instructions 611 may include instructions to partially initialize a tape cartridge, which may be executed in response to the tape cartridge being loaded into the test drive. For example, the partial initialization instructions 611 may include instructions to perform any of the operations described above in relation to partial initialization, such as the operations of block 401 of process 400.

The end-point testing instructions 612 may include instructions to end-point test a tape cartridge, which may be executed once the cartridge has been partially initialized. For example, the end-point testing instructions 612 may include instructions to perform any of the operations described above in relation to end-point testing, such as the operations of block 402 of process 400. In addition, the end-point testing instructions 612 may include instructions to eject the cartridge upon completion of the testing with tape format portion of the CM still being not write-locked (e.g., instructions to perform the operations of block 403 of process 400).

6—Definitions

As used herein, a cartridge is in a "partially initialized" state if it has tape format data written in the tape format portion of its CM, where the tape format portion is write-lockable, and the tape format portion is not write locked.

As used herein, a cartridge is in an "uninitialized" state if it does not have tape format data written in the tape format portion of its CM.

As used herein, a cartridge is in an "initialized" or "fully initialized" state if it has tape format data written in the tape format portion of its CM, where the tape format portion is write-lockable, and the tape format portion is write locked.

As used herein, to "partially initialize" a cartridge is to cause the cartridge to go from an uninitialized state to a partially initialized state.

As used herein, to "fully initialize" a cartridge is to cause the cartridge to go from an uninitialized state or a partially initialized state to a fully initialized state.

As used herein, "controller" refers to processing circuitry of a tape storage drive that is to control operations of the drive including at least reading from and writing to tape. This may include entities that are commonly referred to as a controller, such as a special-purpose chip, but may also include entities that might not normally be referred to as a controller, such as a general-purpose processor executing instructions stored on a machine-readable medium.

As used herein, processing circuitry is configured to perform a particular operations if: (A) it includes dedicated hardware that is to perform the operation, and/or (B) it includes a processor that is coupled to a memory that stores instructions that, if executed by the processor, would cause the processor to perform the operation. Note that this definition does not require the instructions to actually be executed by the processor—the fact that the instructions are capable of being executed is sufficient.

As used herein, to "provide" an item means to have possession of and/or control over the item. This may include, for example, forming (or assembling) some or all of the item from its constituent materials and/or, obtaining possession of and/or control over an already-formed item.

Throughout this disclosure and in the appended claims, occasionally reference may be made to "a number" of items. Such references to "a number" mean any integer greater than or equal to one. When "a number" is used in this way, the word describing the item(s) may be written in pluralized form for grammatical consistency, but this does not necessarily mean that multiple items are being referred to. Thus, for example, a phrase such as "a number of active optical devices, wherein the active optical devices . . . " could encompass both one active optical device and multiple active optical devices, notwithstanding the use of the pluralized form.

The fact that the phrase "a number" may be used in referring to some items should not be interpreted to mean that omission of the phrase "a number" when referring to another item means that the item is necessarily singular or necessarily plural.

In particular, when items are referred to using the articles "a", "an", and "the" without any explicit indication of singularity or multiplicity, this should be understood to mean that there is "at least one" of the item, unless explicitly stated otherwise. When these articles are used in this way, the word describing the item(s) may be written in singular form and subsequent references to the item may include the definite pronoun "the" for grammatical consistency, but this does not necessarily mean that only one item is being referred to. Thus, for example, a phrase such as "an optical socket, wherein the optical socket . . . " could encompass both one optical socket and multiple optical sockets, notwithstanding the use of the singular form and the definite pronoun.

Occasionally the phrase "and/or" is used herein in conjunction with a list of items. This phrase means that any combination of items in the list—from a single item to all of the items and any permutation in between—may be included. Thus, for example, "A, B, and/or C" means "one of: {A}, {B}, {C}, {A, B}, {A, C}, {C, B}, and {A, C, B}".

Various example processes were described above, with reference to various example flow charts. In the description and in the illustrated flow charts, operations are set forth in a particular order for ease of description. However, it should be understood that some or all of the operations could be performed in different orders than those described and that some or all of the operations could be performed concurrently (i.e., in parallel).

While the above disclosure has been shown and described with reference to the foregoing examples, it should be understood that other forms, details, and implementations may be made without departing from the spirit and scope of this disclosure.

What is claimed is:

1. A tape storage drive, comprising:
  reading/writing circuitry that is to read from and write to tape media of tape cartridges; and
  processing circuitry that is to, in response to a tape cartridge being loaded into the tape storage drive, validate initialization of the tape cartridge,
  wherein the processing circuitry is to, in validating initialization of the tape cartridge:
    determine whether a tape format portion of a cartridge memory of the tape cartridge contains tape format data and whether the tape format portion is write-locked; and
    if the tape format portion contains tape format data and is not write-locked,
      fully initialize the tape cartridge including selecting a tape format for the tape cartridge and updating the tape format data to specify the selected tape format,
      write-lock the tape format portion, and then deem initialization of the tape cartridge to be complete.

2. The tape storage drive of claim 1,
wherein the processing circuitry is to, in validating initialization of the tape cartridge, if the tape format portion does not contain tape format data,
fully initialize the tape cartridge including writing tape format data in the tape format portion,
write-lock the tape format portion, and then
deem initialization of the tape cartridge to be complete.

3. The tape storage drive of claim 1,
wherein the processing circuitry is to, in validating initialization of the tape cartridge, if the tape format portion contains tape format data and is write-locked, deem initialization of the tape cartridge to be complete.

4. The tape storage drive of claim 1,
wherein the processing circuitry is to, in updating the tape format data, if the tape format data does not specify the selected tape format, overwrite the tape format data with new tape format data that specifies the tape format.

5. The tape storage drive of claim 1,
wherein the processing circuitry is to, in updating the tape format data, if the tape format data already specifies the selected tape format, leave the tape format data unchanged.

6. The tape storage drive of claim 1,
wherein the processing circuitry is to, in selecting the tape format for the tape cartridge, select the format from a set of formats that the tape storage drive and the tape cartridge are authorized to use.

7. The tape storage drive of claim 1,
wherein the tape storage drive is a linear tape open (LTO) compliant drive.

8. A method, comprising:
providing a tape storage drive that is configured as a test drive;
loading a tape cartridge into the tape storage drive;
causing the tape storage drive to partially initialize the tape cartridge, including writing tape format data to an tape format portion of a cartridge memory of the tape cartridge without write-locking the tape format portion, the tape format portion being write-lockable;
causing the tape storage drive to perform a writing and/or reading test on a tape media of the tape cartridge; and
causing the tape storage drive to eject the tape cartridge in a state in which the tape format portion is not write-locked.

9. The method of claim 8, further comprising:
offering for sale the tape cartridge in a partially initialized state.

10. The method of claim 8, further comprising:
configuring the tape storage drive as a test drive by loading test drive instructions into the tape storage drive, the test drive instructions enabling the tape storage drive to partially initialize the tape cartridge.

11. A non-transitory machine readable medium that includes machine readable instructions that are to, when executed by processing circuitry of a tape storage drive, cause the tape storage drive to:
in response to a tape cartridge being loaded into the tape storage drive, validate initialization of the tape cartridge, and
in validating initialization of the tape cartridge:
determine whether an tape format portion of a cartridge memory of the tape cartridge contains tape format data and whether the tape format portion is write-locked; and
if the tape format portion contains tape format data and is not write-locked,
fully initialize the tape cartridge including selecting a tape format for the tape cartridge and updating the tape format data to specify the selected tape format,
write-lock the tape format portion, and then
deem initialization of the tape cartridge to be complete.

12. The non-transitory machine readable medium of claim 11, wherein the instructions are to cause the tape storage drive to:
in validating initialization of the tape cartridge, if the tape format portion does not contain tape format data,
fully initialize the tape cartridge including writing tape format data in the tape format portion,
write-lock the tape format portion, and then
deem initialization of the tape cartridge to be complete.

13. The non-transitory machine readable medium of claim 11, wherein the instructions are to cause the tape storage drive to:
in validating initialization of the tape cartridge, if the tape format portion contains tape format data and is write-locked, deem initialization of the tape cartridge to be complete.

14. The non-transitory machine readable medium of claim 11, wherein the instructions are further to cause the tape storage drive to:
in updating the tape format data, if the tape format data does not specify the selected tape format, overwrite the tape format data with new tape format data that specifies the tape format.

15. The non-transitory machine readable medium of claim 11, wherein the instructions are further to cause the tape storage drive to:
in updating the tape format data, if the tape format data already specifies the selected tape format, leave the tape format data unchanged.

16. The non-transitory machine readable medium of claim 11, wherein the instructions are further to cause the tape storage drive to:
wherein the processing circuitry is to, in selecting the tape format for the tape cartridge, select the tape format from a set of formats that the tape storage drive is authorized to use.

17. The non-transitory machine readable medium of claim 11,
wherein the tape storage drive is a linear tape open (LTO) compliant drive.

18. A non-transitory machine readable medium that includes machine readable instructions that are to, when executed by processing circuitry of a tape storage drive, in response to a tape cartridge being loaded into the tape storage drive, cause the tape storage drive to:
partially initialize the tape cartridge, including writing tape format data to an tape format portion of a cartridge memory of the tape cartridge without write-locking the tape format portion, the tape format portion being write-lockable; and
after completing a test on the tape cartridge, eject the tape cartridge in a state in which the tape format portion is not write-locked.

19. The non-transitory machine readable medium of claim 18,
wherein the state of the tape cartridge upon being ejected is a partially initialized state in which the tape format data is included in the tape format portion and the tape format portion is not write-locked.

20. The non-transitory machine readable medium of claim 18, wherein the instructions are to cause the tape storage drive to:
  perform the test on the tape cartridge, including writing and read data to tape media of the tape cartridge.

* * * * *